US008668432B2

(12) United States Patent
Sebald et al.

(10) Patent No.: US 8,668,432 B2
(45) Date of Patent: Mar. 11, 2014

(54) BEARING ARRANGEMENT HAVING A DOUBLE-ROW ROLLER BEARING, TURBOCHARGER AND METHOD FOR FEEDING A LUBRICANT TO THE ROWS OF ROLLING BODIES OF A DOUBLE-ROW ROLLER BEARING

(75) Inventors: Wilhelm Sebald, Bad Koenigshofen (DE); Ernst Masur, Untereuerheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 669 days.

(21) Appl. No.: 12/988,711

(22) PCT Filed: Apr. 7, 2009

(86) PCT No.: PCT/EP2009/054117
§ 371 (c)(1),
(2), (4) Date: Mar. 11, 2011

(87) PCT Pub. No.: WO2009/130124
PCT Pub. Date: Oct. 29, 2009

(65) Prior Publication Data
US 2011/0158803 A1 Jun. 30, 2011

(30) Foreign Application Priority Data
Apr. 22, 2008 (DE) .......... 10 2008 020 067

(51) Int. Cl.
*F04D 29/049* (2006.01)

(52) U.S. Cl.
USPC ............... 415/1; 415/112; 415/119; 384/475

(58) Field of Classification Search
USPC ............ 384/99, 473–475; 415/112, 119, 229;
417/407–409, 423.13; 184/7.1
See application file for complete search history.

(56) References Cited

U.S. PATENT DOCUMENTS

| 2,702,093 | A | * | 2/1955 | Sherrill ........................ 184/6.26 |
| 5,683,224 | A | * | 11/1997 | Sebald et al. ................. 415/111 |
| 6,428,212 | B1 | | 8/2002 | Tanaka |
| 2004/0071376 | A1 | | 4/2004 | Greubel |
| 2006/0153483 | A1 | | 7/2006 | Bridges |
| 2008/0087018 | A1 | * | 4/2008 | Woollenweber ............. 60/605.3 |

* cited by examiner

*Primary Examiner* — Edward Look
*Assistant Examiner* — Danielle M Christensen
(74) *Attorney, Agent, or Firm* — Lucas & Mercanti, LLP

(57) ABSTRACT

A hearing arrangement which has a double-row rolling-body bearing, in particular an angular ball bearing for a turbocharger. The rolling-body bearing has at least one outer ring and at least one inner ring between which an intermediate space for two rows of rolling bodies is formed. For reliable and disruption-free lubrication, the rolling-body bearing has a central feed opening formed on the outer ring, and at least one outlet opening, lying opposite the central feed opening, on the inner ring for a lubricant. In the vicinity of each of the rows of rolling bodies, at least one feed opening is provided on the inner ring for feeding the lubricant to the rolling bodies so that the lubricant is injected via the inner ring, and the centrifugal force during the operation of the bearing is utilized.

13 Claims, 2 Drawing Sheets

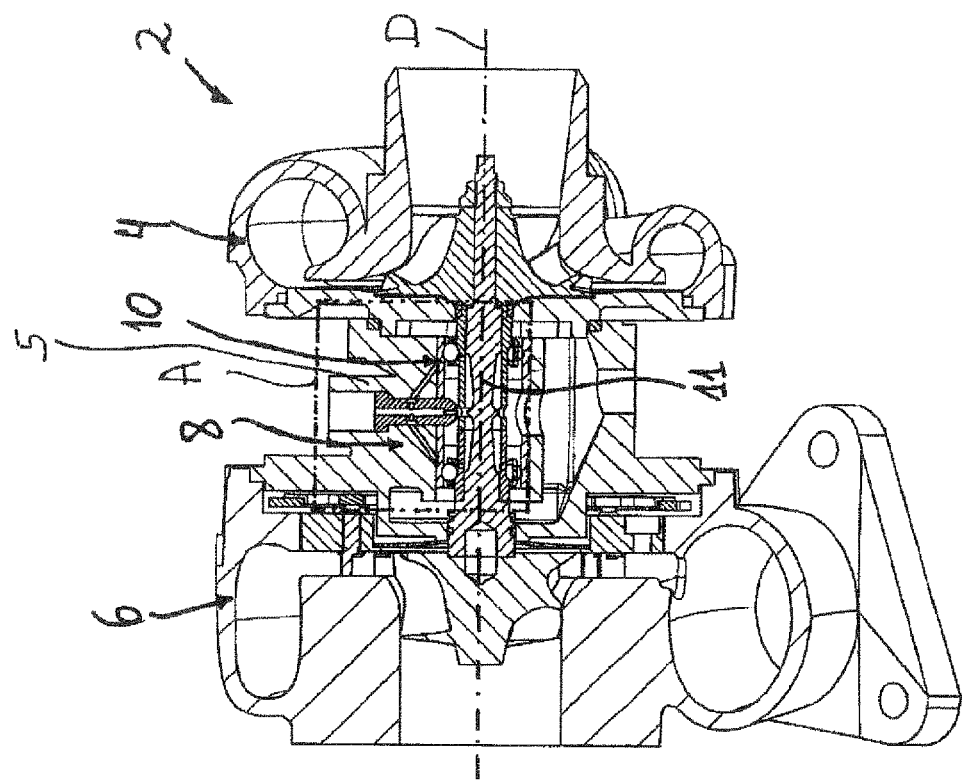

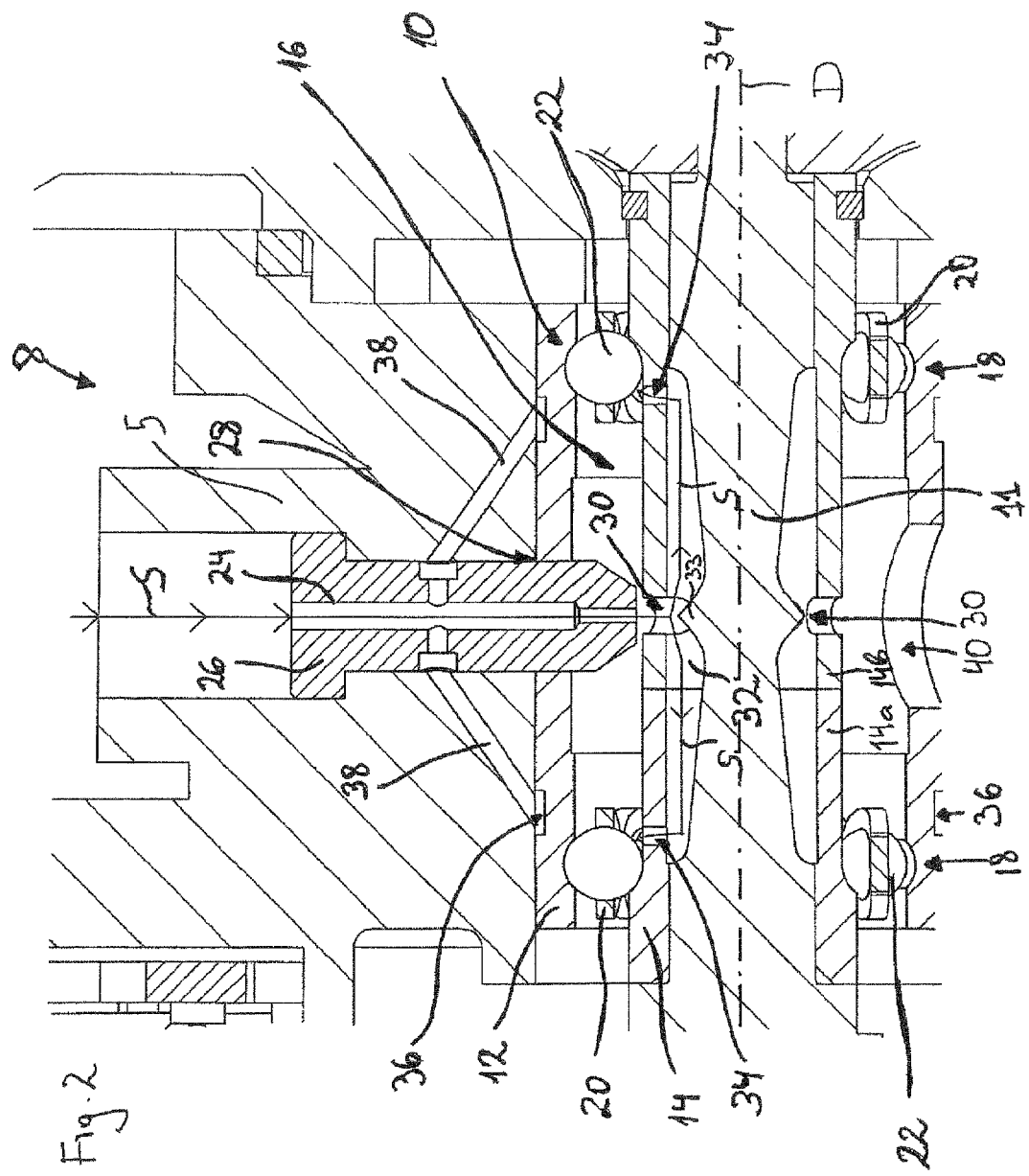

BEARING ARRANGEMENT HAVING A DOUBLE-ROW ROLLER BEARING, TURBOCHARGER AND METHOD FOR FEEDING A LUBRICANT TO THE ROWS OF ROLLING BODIES OF A DOUBLE-ROW ROLLER BEARING

This application is a 371 of PCT/EP2009/054117 filed Apr. 7, 2009, which in turn claims the priority of DE 10 2008 020 067.0 filed Apr. 22, 2008, the priority of both applications is hereby claimed and both applications are incorporated by reference herein

FIELD OF THE INVENTION

The invention relates to a bearing arrangement having a double-row rolling contact bearing. The invention furthermore relates to a turbocharger with a bearing arrangement of this kind and to a method for supplying a lubricant to the rows of rolling elements of a double-row rolling contact bearing.

BACKGROUND OF THE INVENTION

Rolling contact bearings are bearings in which two components that can be moved relative to one another, an inner ring and an outer ring, are separated by rolling elements arranged in an intermediate space. The principal type of friction arising between the rolling elements and the rings is rolling friction, which is kept relatively low by appropriate lubrication.

Rolling contact bearings are used in numerous fields of engineering. Double-row angular contact ball bearings, which represent one form of rolling contact bearing, are used in turbochargers, for example. In the case of small turbochargers for the passenger and commercial vehicle sector, the lubricant is supplied by lateral injection through the outer ring. Here, it is necessary to divide the lubricant flow in advance for each row of balls. As a result, the nozzles for the lubricant are very small and can easily become blocked. Moreover, lubrication or oiling takes place against the rotating parts of the bearing and, as a result, it may be difficult to achieve reliable and efficient oiling. High system pressures are therefore often required.

OBJECT OF THE INVENTION

It is the underlying object of the invention to provide lubrication of a bearing arrangement in a manner which is reliable and advantageous in terms of flow.

SUMMARY OF THE INVENTION

According to the invention, the object is achieved by an arrangement having a double-row rolling contact bearing with at least one outer ring and at least one inner ring, between which an intermediate space for two rows of rolling elements is formed, the rolling contact bearing comprising a central supply opening, formed in the outer ring, and at least one inlet opening, lying opposite said central supply opening, in the inner ring for a lubricant, and, in the region of each of the rows of rolling elements, at least one feed opening being provided in the inner ring for feeding the lubricant to the rolling elements.

According to the invention, the object is furthermore achieved by a turbocharger having a bearing arrangement of this kind.

According to the invention, the object is moreover achieved by a method for supplying a lubricant to the rows of rolling elements of a double-row rolling contact bearing having at least one outer ring and at least one inner ring, the lubricant being passed via a central supply opening in the outer ring and at least one inlet opening, lying opposite said central supply opening, in the inner ring, outside an intermediate space of the rolling contact bearing, and then being fed to the rolling elements via feed openings in the inner ring, in the region of the rows of rolling elements.

The invention is based on the consideration that lubrication of the rows of rolling elements in a reliable and efficient manner is ensured if the lubricant is not passed to the rolling elements via the outer ring but via the inner ring, thereby exploiting the centrifugal force to give particularly advantageous distribution of the lubricant during the operation of the bearing. To enable the lubricant to reach the inner ring of the bearing from outside, the outer ring is provided with the central supply opening, by means of which the entire lubricant flow provided for oiling is passed back outward through the inlet opening in the inner ring, in particular into a space between the inner ring and the shaft. Division of the lubricant into two flows, which are passed to both rows of rolling elements, thus takes place on the inner ring side and only once the lubricant is outside the intermediate space. Finally, the lubricant is fed directly to the rolling elements in the region of the rows of rolling elements, in particular under the rolling element cages, through the feed openings.

By virtue of the improved lubrication of the rolling contact bearing, it is possible, in particular, to reduce the quantity of lubricant used. Moreover, optimizing the supply of lubricant entails a reduction in the operating temperature of the bearing since the lubricant cools the parts of the bearing with which it comes into contact, in particular the inner ring and the shaft, during the operation of the bearing. The reduction in the operating temperature makes it possible, in particular, to use inexpensive materials for the construction of the bearing parts, thereby allowing economical implementation of the bearing.

It is advantageous if the rolling contact bearing is connected to a shaft and a distribution space for the lubricant is formed between the inner ring and the shaft. In this case, the distribution space is distinguished by having a plurality of openings, namely the at least one inlet opening in the center of the inner ring, through which the lubricant enters the distribution space, and the lateral feed openings in the inner ring, through which the lubricant, divided into two flows in the distribution space, is fed to the rolling elements. In this case, it is possible for two or more inlet openings to be provided around the circumference of the inner ring and also for a plurality of feed openings to be provided for each row of rolling elements. The particular advantage of this embodiment is that the arrangement of the distribution space between the inner ring and the shaft also ensures that the shaft is cooled by means of the lubricant. As an alternative, there is also the possibility of conducting the distribution of the lubricant within the inner ring, e.g. by means of channels, formed in the inner ring itself, between the inlet opening and the feed openings.

According to a preferred embodiment, the bearing arrangement comprises two circumferential grooves in the outer ring in the region of the rows of rolling elements. The circumferential grooves in the outer ring resemble the prior art solution for lubricating the rows of rolling elements but, in the bearing arrangement proposed, serve exclusively to distribute the lubricant in the manner of a "squeeze film" between the outer ring and a bearing housing. The grooves are therefore not connected to the intermediate space or to the rolling elements in terms of flow and are not provided for the purpose of lubricating the rolling elements.

According to another preferred embodiment, the bearing arrangement comprises a radial channel for the lubricant, which channel passes through the central supply opening in the outer ring and extends in a direction toward the inlet opening in the inner ring. The lubricant can thus be passed directly to the inlet opening. Another advantage here is that a single channel is provided for the entire flow to lubricate and cool the bearing parts and the shaft, said channel having a larger diameter than in the solution known from the prior art, which has two oil channels in the outer ring. The risk that the radial channel will become blocked is thus significantly reduced.

In order to provide sufficient lubricant for the squeeze film, the radial channel preferably has two branch channels outside the rolling contact bearing for supplying lubricant to the circumferential grooves in the outer ring.

To enable the lubricant to be divided up, even before it reaches the outer ring of the rolling contact bearing, a preferred variant provides means for setting a lubricant flow between the radial channel and the branch channels. The means can be in the form of one or more restrictors or restriction elements, for example. Suitable versions of these are selected and employed, according to the respective requirements, when configuring and assembling the bearing arrangement, for example. It is also conceivable for the lubricant flow to be set by means of the different cross sections of the radial channel and of the branch channels.

As an alternative, it is also possible to decouple the lubricant for the squeeze film from the lubricant flow for lubricating the bearing. In this embodiment, two branch channels for supplying the lubricant to the circumferential grooves in the outer ring are preferably provided outside the rolling contact bearing, separately from the radial channel.

It is furthermore advantageous that the radial channel is formed in a cylindrical element, and the cylindrical element connects the bearing housing and the outer ring to one another by projecting into the supply opening. In particular, the cylindrical element is interchangeable, thus enabling cylindrical elements with radial channels of different widths to be used, depending on lubricant requirements.

With respect of lubricant supply in a manner which is advantageous in terms of flow, it is furthermore advantageous that the inlet opening is formed obliquely or in a spiral counter to the direction of rotation of the inner ring and with an inward slope.

It is expedient for the rolling contact bearing to be a two-row angular contact ball bearing with a two-part inner ring, which is arranged on a turbocharger, in particular.

With regard to its area of application, the bearing must have an axial play which is favorable for high speeds of rotation. Given this background, the rolling contact bearing is preferably embodied with an axial play of about 0 mm.

BRIEF DESCRIPTION OF THE DRAWING

An illustrative embodiment of the invention is explained in greater detail with reference to a drawing, in which:

FIG. 1 shows a turbocharger having a double-row angular contact ball bearing in longitudinal section, and FIG. 2 shows an enlargement of the detail A in accordance with FIG. 1.

In the figures, parts with the same action are provided with the same reference signs.

DETAILED DESCRIPTION OF THE DRAWING

FIG. 1 shows a turbocharger 2 which essentially comprises a compressor housing 4, a bearing housing 5 and a turbine housing 6, between which a bearing arrangement 8 is arranged. A detailed depiction of the bearing arrangement 8 can be seen in FIG. 2, in which the detail A is shown on an enlarged scale.

The bearing arrangement 8 has a double-row rolling contact ball bearing 10, in this case an angular contact ball bearing, which is arranged on a rotating shaft 11 of the turbocharger 2. The bearing 10 comprises an outer ring 12 and, in this illustrative embodiment, a two-part inner ring 14, between which an intermediate space 16 is formed. The two inner ring parts 14a, 14b lie end-to-end. Arranged in the intermediate space 16 are two rows 18 of balls, each comprising a plurality of balls 22 held by a cage 20. During the operation of the turbocharger 2, the shaft 11 rotates about an axis D of rotation, and the inner ring 14 rotates along with it. The balls 22 are taken along by the inner ring 14 and roll on the fixed outer ring 12, giving rise to rolling friction between the balls 22 and the inner ring 14, on the one hand, and the balls 22 and the outer ring 12, on the other hand. In order to minimize this friction, a lubricant S, in particular an oil, which is indicated by the arrows S, is fed to the balls 22.

To supply the lubricant S to the bearing 10, a radial channel 24 is provided, which is formed in a cylindrical element 26. The cylindrical element 26 extends through a wall of the turbocharger 2 in the region of the bearing arrangement 8 and is passed through a central supply opening 28 in the outer ring 10 and through the intermediate space 16 in a direction toward an inlet opening 30 in the inner ring 14. The inlet opening 30 is likewise formed centrally in the inner ring 14 and corresponds to the central supply opening 28. In the illustrative embodiment shown, the inner ring 14 is provided with a plurality of inlet openings 30, it being possible to see one further, diametrically opposite inlet opening 30, in the figure.

The cylindrical element 26 is, in particular, interchangeable and can be interchanged with another cylindrical element in which a radial channel 24 with a different diameter is formed. In this illustrative embodiment, the cylindrical element 26 opens directly in front of the inlet opening 30 inner ring 14, and its outer contour is of conical configuration in its outlet area in front of the inner ring 14. In addition, the radial channel 24 has a smaller diameter in the outlet area than in the remaining area of the cylindrical element 26, with the result that the lubricant flow S is controlled by virtue of the Venturi effect in this area. By virtue of the fact that the cylindrical element 26 opens directly in front of the inner ring 14 without touching the latter, there is, on the one hand, a connection in terms of flow between the radial channel 24 and the inlet opening 30 and, on the other hand, rotation of the inner ring 14 is not impaired by the cylindrical element 26.

In this case, the lubricant S is supplied from outside the bearing arrangement 8, via the radial channel 24, through the supply opening 28 and the inlet opening 30, to a distribution space 32 formed between the inner ring 14 and the shaft 11. In the region of the inlet opening 30, the shaft 11 has an annular circumferential ridge 33, by means of which the lubricant S is divided into two flows. On both sides of the ridge 33, the distribution space 32 tapers, as a result of which the two lubricant flows S are accelerated and directed toward two feed openings 34 in the inner ring 14. The feed openings 34 are formed in the region of the rows 18 of balls, and the lubricant flows S are injected through said openings, toward the rows 18 of balls, owing to the high pressure of the lubricant S and the centrifugal force during the operation of the turbocharger 2, in order to minimize the friction on the balls 22.

Formed in the outer ring 12, in the region of the rows 18 of balls, there are furthermore circumferential grooves 36, which are likewise filled with lubricant S in order to form a squeeze film to dampen the vibrations of the bearing 10. However, the grooves 36 are connected neither to the intermediate space 16 nor to the balls 22 in terms of flow. In order to provide lubricant S for the squeeze film, two branch channels 38 are branched off from the radial channel 24. In this illustrative embodiment, different lubricant flows in the radial channel 24 and the branch channels 38 are set through appropriate choice of the cross sections of the radial channel 24 and of the branch channels 38. As an alternative, it is also possible to provide active restriction elements, which are set once, before the turbocharger 2 is put into operation, or by means of which the lubricant flow S is regulated during operation. A drain hole 40 for excess lubricant S is provided in the outer ring 12, underneath the shaft 12, diametrically opposite the radial channel 24.

The bearing arrangement 8 described represents a completely new concept for the continuous oiling of the angular contact ball bearing 10, which is based on the fundamental idea that lubricant S can be fed to the balls 22 in a simple and reliable manner if the lubricant S is injected not via the outer ring, as hitherto, but via the inner ring 14, thereby also exploiting the centrifugal force during the rotation of the shaft 12 and the inner ring 14. In the bearing arrangement 8, the lubricant S which is in the distribution space 32 is advantageously used to cool the shaft 12 and the inner ring 14, resulting in lower operating temperatures.

LIST OF REFERENCE SIGNS

2 Turbocharger
4 Compressor housing
5 Bearing housing
6 Turbine housing
8 Bearing arrangement
10 Rolling contact bearing
11 Shaft
12 Outer ring
14 Inner ring
14a, 14b Inner ring parts
16 Intermediate space
18 Row of balls
20 Cage
22 Balls
24 Radial channel
26 Cylindrical element
28 Supply opening

The invention claimed is:

1. A bearing arrangement, comprising:
a double-row rolling contact bearing with at least one outer ring and at least one inner ring, an intermediate space being formed between the outer ring and the inner ring; and
two rows of rolling elements arranged in the intermediate space,
the rolling contact bearing comprising a central supply opening formed in the outer ring, and at least one inlet opening, lying opposite the central supply opening, in the inner ring for a lubricant, and, in a region of each of the rows of rolling elements, at least one feed opening is provided in the inner ring for feeding the lubricant to the rolling elements.

2. The bearing arrangement as claimed in claim 1, further comprising a shaft, the contact bearing being connected to the shaft so as to form a distribution space for the lubricant between the inner ring and the shaft.

3. The bearing arrangement as claimed in claim 1, further comprising two circumferential grooves in the outer ring in a region of the rows of rolling elements.

4. The bearing arrangement as claimed in claim 3, further comprising a radial channel for the lubricant, which channel passes through the central supply opening in the outer ring and extends in a direction toward the inlet opening in the inner ring.

5. The bearing arrangement as claimed in claim 4, wherein the radial channel has two branch channels outside the rolling contact bearing for supplying lubricant to the circumferential grooves in the outer ring.

6. The bearing arrangement as claimed in claim 5, wherein means for setting a lubricant flow are provided between the radial channel and the branch channels.

7. The bearing arrangement as claimed in claim 4, wherein two branch channels for supplying the lubricant to the circumferential grooves in the outer ring are provided outside the rolling contact bearing, separately from the radial channel.

8. The bearing arrangement as claimed in claim 4, further comprising a cylindrical element that connects a bearing housing and the outer ring to one another by projecting into the supply opening, the radial channel being formed in the cylindrical element.

9. The bearing arrangement as claimed in claim 1, wherein the inlet opening is formed obliquely or in a spiral counter to a direction of rotation of the inner ring and with an inward slope.

10. The bearing arrangement as claimed in claim 1, wherein the rolling contact bearing is a two-row angular contact ball bearing with a two-part inner ring.

11. The bearing arrangement as claimed in claim 1, wherein the rolling contact bearing has an axial play of about 0 mm.

12. A turbocharger having a bearing arrangement comprising a double-row rolling contact bearing with at least one outer ring and at least one inner ring, an intermediate space being formed between the outer ring and the inner ring; and two rows of rolling elements arranged in the intermediate space, the rolling contact bearing comprising a central supply opening formed in the outer ring, and at least one inlet opening, lying opposite the central supply opening, in the inner ring for a lubricant, and, in a region of each of the rows of rolling elements, at least one feed opening is provided in the inner ring for feeding the lubricant to the rolling elements.

13. A method for supplying a lubricant to rows of rolling elements of a double-row rolling contact bearing having at least one outer ring and at least one inner ring, the method comprising the following steps:
passing the lubricant via a central supply opening in the outer ring and at least one inlet opening, lying opposite the central supply opening, in the inner ring, outside an intermediate space of the rolling contact bearing; and then feeding the lubricant to the rolling elements via feed openings in the inner ring, in a region of the rows of rolling elements.

* * * * *